US009314948B2

(12) United States Patent
Johnson et al.

(10) Patent No.: US 9,314,948 B2
(45) Date of Patent: Apr. 19, 2016

(54) SYSTEMS AND METHODS FOR EMPLOYING MAGNETIC ASSISTANCE IN PRECISION WIRE PLACEMENT WHEN PRODUCING OVERMOLDED PRODUCTS

(71) Applicant: Palo Alto Research Center Incorporated, Palo Alto, CA (US)

(72) Inventors: David Johnson, San Francisco, CA (US); Eric Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 617 days.

(21) Appl. No.: 13/668,199

(22) Filed: Nov. 2, 2012

(65) Prior Publication Data

US 2014/0124982 A1 May 8, 2014

(51) Int. Cl.
 B29C 45/14 (2006.01)
 B29C 33/16 (2006.01)
 B41J 2/175 (2006.01)
 B29L 31/34 (2006.01)

(52) U.S. Cl.
 CPC ........... B29C 45/14065 (2013.01); B29C 33/16 (2013.01); B29C 45/14549 (2013.01); B29C 45/14639 (2013.01); B41J 2/17593 (2013.01); B29L 2031/3481 (2013.01)

(58) Field of Classification Search
 CPC ................. B29C 2045/1746; B29C 45/14065; B29C 33/16; B29C 2045/14229
 USPC ...................... 264/275, 470; 425/3
 See application file for complete search history.

(56) References Cited

U.S. PATENT DOCUMENTS

| 5,527,174 A * | 6/1996 | Godin et al. ............... 425/126.1 |
| 6,278,269 B1 * | 8/2001 | Vig et al. .................. 324/207.2 |
| 2002/0086443 A1 * | 7/2002 | Bamdad ........................ 436/526 |
| 2003/0122272 A1 * | 7/2003 | Smith et al. .................. 264/40.1 |
| 2007/0252876 A1 * | 11/2007 | Platt et al. ........................ 347/88 |

FOREIGN PATENT DOCUMENTS

| JP | 402215540 | * 8/1990 |
| JP | 2844001 | * 8/1999 |

OTHER PUBLICATIONS

Machine translation of JP-2844001 retrived Mar. 6, 2015.*
English abstract of JP-402215540 ,1990.*

* cited by examiner

*Primary Examiner* — Joseph S Del Sole
*Assistant Examiner* — Mohamed K Ahmed Ali
(74) *Attorney, Agent, or Firm* — Ronald E. Prass, Jr.; Prass LLP (57) ABSTRACT

A system and method are provided for using magnetic elements to secure thin wires precisely in an injection molding process in a manner that matches a three-dimensional shape of the an injection molded product produced by the injection molding (overmolding) process. The thin wires are substantially immobilized in a manner that is designed to generally overcome the tendency of the thin wires, which have little mechanical strength, to normally deflect during an injection molding process by employing the magnetic forces produced by embedded magnets. Magnets are integrated into either the cavity or core of a mold structure and the thin wires are placed on those magnets to keep the wires in place during an injection molding process that allows the thin wires to be overmolded. A balance of the core and/or cavity of the mold will be formed of a non-magnetic material.

22 Claims, 7 Drawing Sheets

SYSTEMS AND METHODS FOR EMPLOYING MAGNETIC ASSISTANCE IN PRECISION WIRE PLACEMENT WHEN PRODUCING OVERMOLDED PRODUCTS

BACKGROUND

1. Field of the Disclosed Embodiments

This disclosure relates to systems and methods for integrating magnetic elements into at least one of a cavity or a core of a mold used in injection molding processes for forming overmolded components, the magnets facilitating precise placement of thin wires in the overmolded components.

2. Related Art

The term solid (or phase-change) inkjet printing refers to a class of image forming processes and/or image forming devices that employ inks that are presented in a solid, often wax-like, form. The solid inks are melted into a liquid form or phase between an ink loading portion of an ink storage and supply device and an ejection-type ink delivery printhead. The ejection-type ink delivery printhead may dispose the ink presented to it in a melted/liquid form or phase onto a heated intermediate transfer structure such as an intermediate transfer drum, or directly onto a substrate of an image receiving medium, which may also have been preliminarily heated to better accept the melted ink.

Solid (or phase-change) inkjet printers melt the solid ink to a liquid at an outlet end of the ink storage and supply device before the ink is fed to the complex plumbing of the inkjet printhead. The ink then, in its heated/liquid form or phase, is typically jetted from the nozzles using a piezoelectric actuated printhead, sometimes referred to as a "jetstack." The printhead is used to deliver the ink, in its heated/liquid form or phase, to a heated surface of the intermediate transfer apparatus for further transfer to a substrate of image receiving medium, or directly to the substrate where the ink cools to form a sometimes significantly raised printed image on the substrate.

A typical configuration of a solid (or phase-change) inkjet delivery system printhead often includes multiple laminated plates, sheets or layers stacked in a superimposed relationship. The multiple laminated plates, sheets or layers may be formed from different materials, which include stainless steel and polyimide, among others. The plates, sheets or layers, in a direction from an ink source in the form of an ink storage and supply device to the ink outlet nozzles, may include: a layer including multiple piezoelectric transducers, a diaphragm plate layer on which the piezoelectric transducers act, an ink pressure chamber plate layer, an inlet/outlet plate layer, an adhesive layer, an aperture brace plate layer (also referred to as a "support brace" layer), and an outlet aperture plate, which may also be referred to as an orifice plate or a front face plate. The outlet aperture plate will generally be made of stainless steel and be relatively thin. Typically, the outlet aperture plate and the aperture brace plate layer are brazed together using, for example, a high temperature interface alloying process, to form an aperture plate/brace plate unit. The aperture plate/brace plate unit may then be glued with the rest of the jetstack using the adhesive layer.

The inkjet printhead may include one or more ink pressure chambers coupled to, or in fluid communication with, one or more ink inlets, via which ink is introduced into the inkjet printhead from one or more ink sources, and one or more ink ejection outlets, for example, apertures, orifices or nozzles, via which ink is ejected as a stream of ink droplets to be deposited on a substrate. A typical inkjet printer includes a plurality of printheads with a plurality of ink pressure chambers with each of the plurality of ink pressure chambers being in fluid communication with one or more of the apertures/orifices. Each aperture/orifice may be in fluid communication with a respective ink pressure chamber by way of the ink passage.

In general then, the inkjet printhead comprises a stack of joined plates that have manifolds to route the ink from ink sources to the image receiving medium substrate via an array of individual jets each ending in a respective aperture/orifice from which the ink is dispensed. The plates of the inkjet printhead are aligned such that respective holes in each plate form the ink passages. The respective holes in each of the layers other than the aperture plate layer may be of a same size or of varying sizes. Common to these devices is that the apertures/orifices are generally of a significantly smaller cross-sectional dimension than the respective holes in each of the layers above the aperture plate.

In operation, the piezoelectric transducers receive an activating signal, and upon activation, depress the portion of the diaphragm plate with which they are associated exerting a pressurizing force on individual ones of the ink pressure chambers formed in the inkjet printhead pushing the ink downward along the vertical portion of an ink flow path and ejecting the ink as droplets from the respective apertures/orifices.

SUMMARY OF DISCLOSED SUBJECT MATTER

Figure 1:
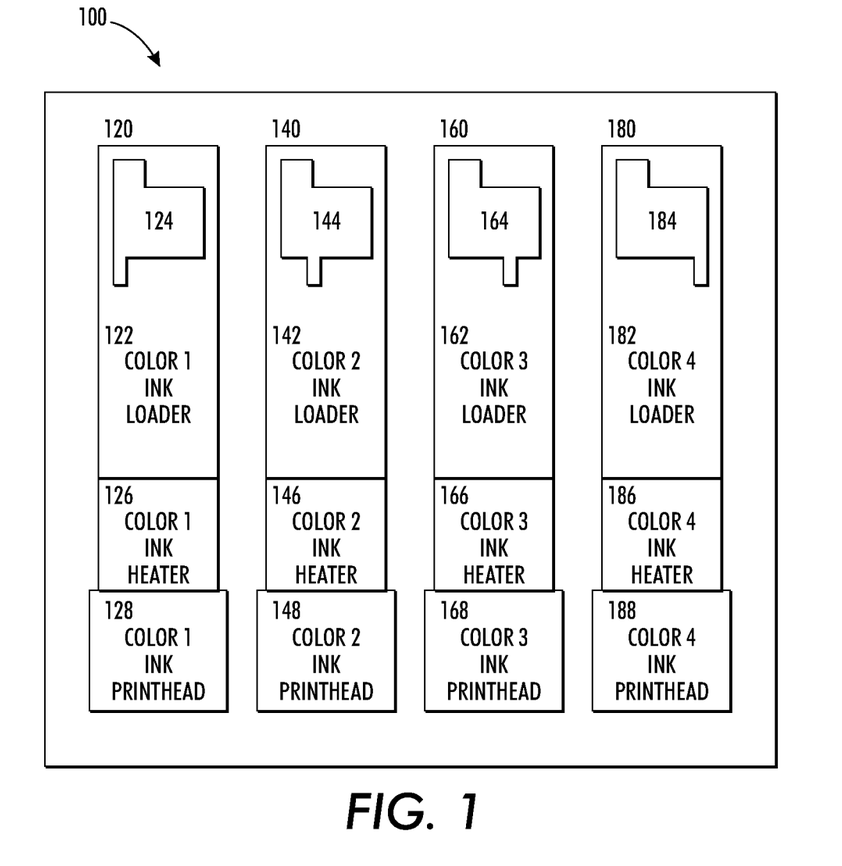
FIG. 1 illustrates a simple block diagram of an exemplary set of four (four color) solid ink delivery devices with which ink reservoirs fabricated with the systems and methods according to this disclosure may be used.

FIG. 1 illustrates a simple block diagram of an exemplary set 100 of four (four color) solid ink delivery devices 120, 140, 160, 180. Each of the four solid ink delivery devices 120,140,160,180 includes at least a color N ink loader 122, 142,162,182, which may include a specifically-configured ink insertion opening 124,144,164,184. The specifically-configured ink insertion openings 124,144,164,184 may be configured to allow for the passage of only a particularly-colored solid ink element with an outer physical profile that, in cross section, corresponds to only one of the ink insertion openings 124,144,164,184. In this manner, only inks of a single color with a corresponding profile may be routinely introduced into each color N ink loader as an ink storage and supply portion of the solid ink delivery devices 120,140,160,180. In the described manner, dropping solid ink blocks into the individual color N ink loaders 122,142,162,182 is a simple and clean operation with each color block being molded differently in an effort to ensure correct placement.

As shown in FIG. 1, positioned between the color N ink loaders 122,142,162,182 and respective color N ink printheads 128,148,168,188 via which the ink exits the four solid ink delivery devices 120,140,160, 180 are respective color N ink heaters 126,146,166,186. It is in these heater portions, in a typical printhead design, where individual heating elements are embedded to cause the ink to be changed in phase from solid to liquid by melting the solid ink with the respective color N ink heaters 126,146,166,186.

Individual heating elements in individual printheads are often provided as inductive heaters that may be laminated between multiple layers of polyimide and then added to the layer stack up of the inkjet printhead jetstack. When heating up portions of the inkjet printhead, it can be difficult to control the heat flux introduced to and permeating the solid wax ink in, for example, a solid to heated/liquid ink reservoir. The ink reservoir is typically in a three-dimensional shape making the controlled heating of the solid wax ink into a homogeneous liquid phase difficult.

In the solid ink heating/melting process, it would be highly desirable to be able to deliver the heat precisely throughout the ink reservoir to provide specific control to the process by putting heat exactly where it is intended, thereby accelerating the heating process in a controlled manner.

Typical to the processes for fabricating solid ink reservoirs is an injection molding or overmolding process. The process of overmolding in the injection molding industry is very common. The process is often undertaken, for example, to encapsulate metal conductors in an overmolded structure to form a connector. In the injection molding or overmolding process, a metal or plastic part may be held by a mold while molten plastic is injected into the injection molding mold to form a particular overmolded structure.

In general, the overmolding process relies on a physical connection between a metal mold and an insert. The physical strength of a held part in the metal mold can be important in order that the held part may withstand the high pressures and speeds of injection involved in the injection molding or overmolding process.

In the fabrication process for ink heater reservoirs for use in phase-change inkjet printheads, precise positioning of the heating elements is strongly desired. A difficulty arises in that these heating elements are often constituted of a particular pattern of thin resistive (heating) wires. The thin resistive (heating) wires often cover a complex path within the overmolded reservoir product to provide even heating. Thin heating wires, however, are extremely difficult to overmold in any complexity because they have very little mechanical strength, which adversely affects their retaining their positioning in the injection molding device against the pressures and speeds of molten material flow induced in the injection molding process. As such, the thin resistive (heating) wires are very often deflected during the injection molding process. These deflections may lead to difficulties in the fabricated ink heater reservoirs in that deviations from precise patterning may cause deviations from an optimal heating profile, or otherwise even more detrimentally may cause electrical shorting that may damage the image forming devices with which the printheads including these ink heater reservoirs are associated.

In view of the above difficulties in the typical injection molding fabrication process for ink heater reservoirs in inkjet printheads, it may be advantageous to provide systems and methods an objective of which is to largely immobilize the thin resistive wires with respect to the injection mold during the injection molding process. It is desirable to place thin resistive heating wires precisely and in a manner that matches a three-dimensional shape of the ink heater reservoir as a fluid holding chamber. The thin resistive heating wires should be substantially immobilized in a manner that is designed to generally overcome the tendency of the thin resistive heating wires, which have little mechanical strength, to normally deflect during an injection molding process.

Exemplary embodiments of the disclosed systems and methods may provide a mechanism by which thin resistive wires may generally be held in place by magnetic forces in an injection molding process.

Exemplary embodiments may be configured to address shortfalls in prior art systems in which heat control in solid ink melting portions of inkjet printheads is coarse and overmolding thin resistive wires is difficult to due to injection pressures involved.

Exemplary embodiments may address the know shortfalls in the prior art by attempting to ensure that the thin resistive wires are held in precise locations during an overmolding process by using magnetic forces to hold the thin resistive wires in place.

Exemplary embodiments may provide a magnet, plurality of magnets, or magnetic structure that is integrated into either the cavity or core of a mold structure and on which the thin resistive wires are placed to keep the wires in place during an injection molding process that allows the thin resistive wires to be overmolded in an injection molding process.

Exemplary embodiments may provide that the thin resistive wires are held in place by magnetic forces.

Exemplary embodiments may provide a mechanism for immobilizing the thin wires in a manner that does not introduce any additional physical structure into a mold cavity that may impede, for example, removal of a molded product from the mold cavity after fabrication.

Exemplary embodiments may provide that, during construction of an injection mold device, one or more desired paths for thin resistive wires being traced along a surface of the core or the cavity of the mold. In those discrete locations, instead of a normal mold material, a magnetic material may be provided. A balance of the core and/or cavity of the mold will be formed of a non-magnetic material.

In exemplary embodiments, the magnetic material may comprise a ferromagnetic material, such as, for example, Samarium Cobalt (SmCo), the magnetic properties of which are well known.

In exemplary embodiments, a selected ferromagnetic material should have a Curie temperature above that of the mold temperature during the injection molding or overmolding process.

In exemplary embodiments, the magnetic material may include an electromagnet or electromagnetic structure.

Exemplary embodiments may provide a molding process that includes preliminary processing by which a robot may load the thin resistive wires into an injection mold and along at least a portion of a magnetized trace disposed therein prior to the introduction of a molten injection molding material.

Exemplary embodiments may provide that molten plastic may be injected into an injection mold to overmold thin resistive wires that are held in place by magnetic forces in the mold in a manner that the thin resistive wires may be embedded in the final part. The thin resistive wires may be disposed on a trace that follows the cavity closely resulting in a desired heat flux distribution in a finished injection molded (overmolded) product.

Exemplary embodiments, while described as being particularly adaptable to injection molding parts for inkjet printer components may also find utility in applications outside of printing that include the use of implanted wires could be any type, pre-heating chambers for fluids for different uses including combustion among others, and selective heating on microfluidics and/or reaction chambers.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for integrating magnets into at least one of a cavity or a core of a mold for use in forming overmolded components, the magnets facilitating precise placement of thin wires in the overmolded components, will be described, in detail, with reference to the following drawings, in which.

DETAILED DESCRIPTION OF THE DISCLOSED EMBODIMENTS

The systems and methods for integrating magnets into at least one of a cavity or a core of a mold for use in forming overmolded components in an injection molding process with the magnets facilitating precise placement of thin wires in the overmolded components according to this disclosure will generally refer to this specific utility for those systems and methods. Exemplary embodiments described and depicted in this disclosure should not be interpreted as being specifically limited to any particular configuration of an injection molding device, except that any configuration of the injection molding device will include the use of magnets or magnetic trace components as essential elements in the manner described throughout this disclosure. Any advantageous use of a magnetic trace to substantially immobilize wire elements in an injection molding process employing devices and methods such as those discussed in detail in this disclosure is contemplated.

Specific reference to, for example, any particular injection molded product, such as, for example, an ink heater reservoir for use in a solid ink image forming device, should be understood as being exemplary only, and not limiting, in any manner, to any particular class of injection molded products. The systems and methods according to this disclosure will be described as being particularly adaptable to use in forming solid ink heater reservoirs for use in solid (or phase-change) inkjet image forming, printing and/or copying devices. These references are meant to be illustrative only in providing a single real-world utility for the disclosed systems and methods, and should not be considered as limiting the disclosed systems and methods to any particular injection-molded product or to any particular type of device in which such injection molded products may be used. Any commonly-known processor-controlled injection molding device in which the processor directs use of magnets or magnetic trace elements in an injection mold to substantially immobilize wire elements in an injection molding process that may be adapted according to the specific capabilities discussed in this disclosure is contemplated.

Figure 2:
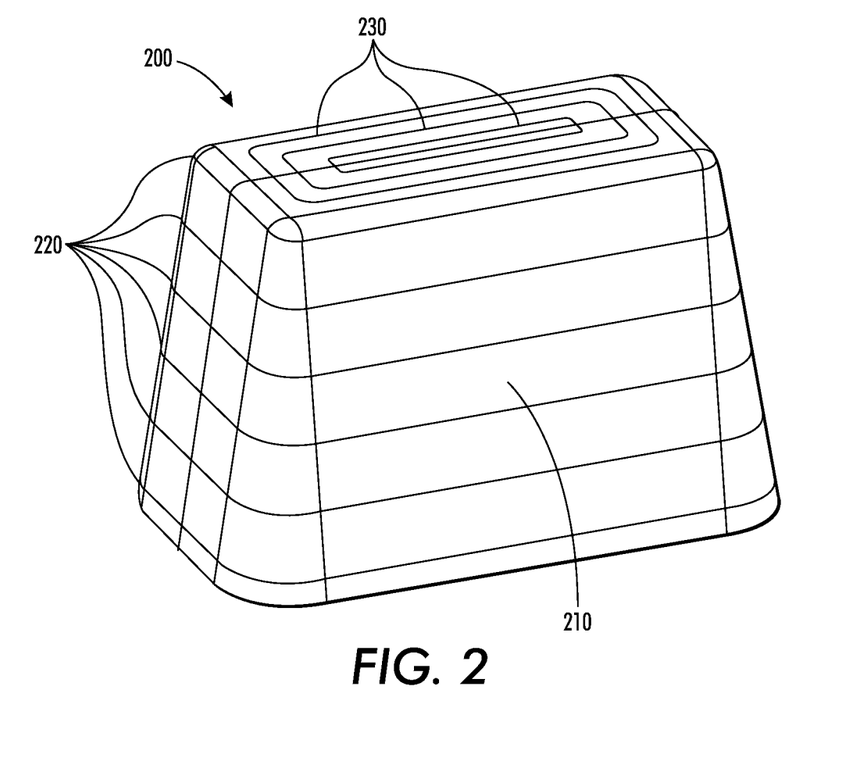
FIG. 2 illustrates an exemplary embodiment of a magnetic trace pattern embedded in a mold core according to this disclosure.

FIG. 2 illustrates an exemplary embodiment 200 of magnetic trace pattern embedded in an injection mold core component 210 according to this disclosure. As shown in FIG. 2, a plurality of magnetic trace elements 220,230 may be embedded in a surface of the injection mold core component 210. The magnetic trace elements may also or alternatively be embedded in an outer wall component (generally referred to as the cavity) or insert component of the injection molding mold.

The magnetic trace elements 220,230 may be formed of a ferromagnetic material. The selected ferromagnetic material should have a Curie temperature that is above a highest temperature to which the injection molding mold may be elevated or exposed in the injection molding process in order that the ferromagnetic properties of the magnetic material remain unaffected by the injection molding process.

A particular ferromagnetic material for forming the disclosed magnetic trace elements 220,230 may include permanent Samarium Cobalt magnets (SmCo) composed of samarium, cobalt and iron. These rare earth magnets are extremely strong for their small size and may be formed in myriad simple shapes such as rings, blocks and discs. Samarium Cobalt magnets are particularly usable in this context based on their high resistance to demagnetization, relatively high ratio of magnetic strength to size, and excellent temperature stability.

The magnetic trace elements 220,230 may alternatively be formed as electromagnetic elements.

Figure 3:
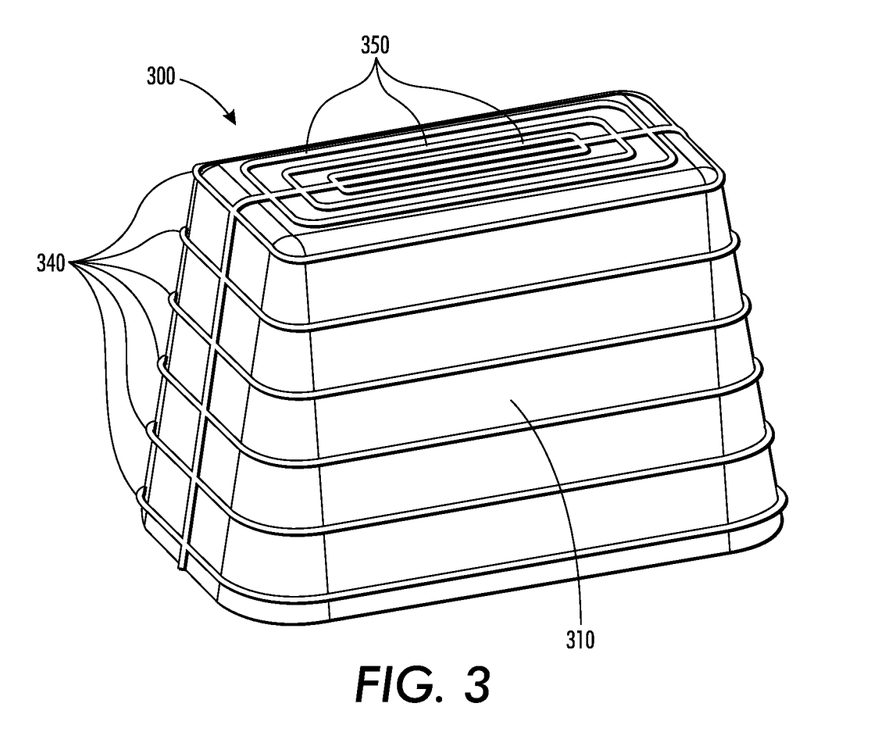
FIG. 3 illustrates an exemplary embodiment of a placement scheme of thin resistive wires on a magnetic trace pattern embedded in a mold core prior to overmolding in an injection molding process according to this disclosure.

FIG. 3 illustrates an exemplary embodiment 300 of a placement scheme of thin resistive wires 340,350 on a magnetic trace pattern such as that shown in FIG. 2 prior to overmolding with an injection molding material in an injection molding process according to this disclosure. As shown in FIG. 3, thin resistive wires 340,350 may be formed on all segments, or alternatively on only select portions or segments, of the magnetic trace pattern provided in one or the other of the core 310, or wall elements (not shown) of the injection molding mold. An objective is to substantially immobilize those thin resistive wires 340,350 against the pressures exerted by the injection molding process in order that the dispersion of the thin resistive wires in the final injection molded (overmolded) product is as planned and/or desired.

Figure 4:
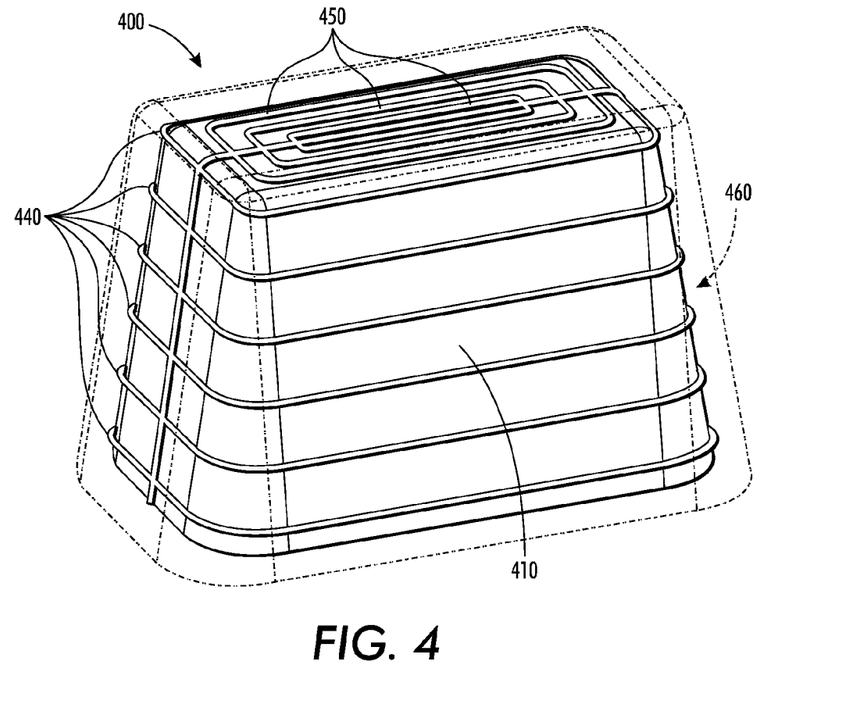
FIG. 4 illustrates an exemplary embodiment of an overmold product in the process of being formed over the mold core and the thin wires in an injection molding process according to this disclosure.

FIG. 4 illustrates an exemplary embodiment 400 of an overmolded product 460 in the process of being formed over the mold core 410 and the thin resistive wires 440,450 in an injection molding process according to this disclosure. Injection molding material, such as molten plastic, is injected between the mold cavity (not shown) and the mold core 410 to form an overmolded product 460 that embeds the thin resistive wires 440,450 in the final overmolded product 460.

Figure 5:
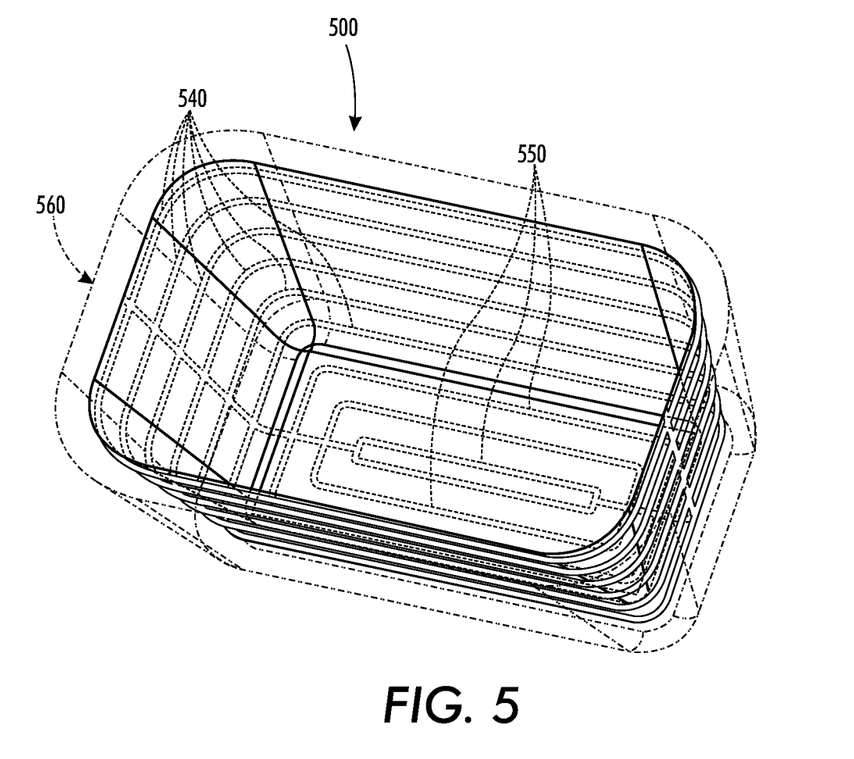
FIG. 5 illustrates an exemplary embodiment of a finished overmold product formed by an injection molding process in which thin resistive wires are precisely embedded based on the systems and methods according to this disclosure.

FIG. 5 illustrates an exemplary embodiment 500 of a finished overmolded product 560 formed by an injection molding process in which thin resistive wires 540,550 are precisely embedded based on the thin resistive wires 540,550 having been magnetically held in place on at least a portion of a magnetic trace provided in at least one of an inner mold core and an outer mold wall of an injection molding mold. The magnetic trace is exposed to the injection molding process such that the thin resistive wires 540,550 are exposed to the filling of the mold with a molten injection molding material in a manner that embeds the thin resistive wires 540,550 in the walls of the finished overmolded product 560.

Figure 6:
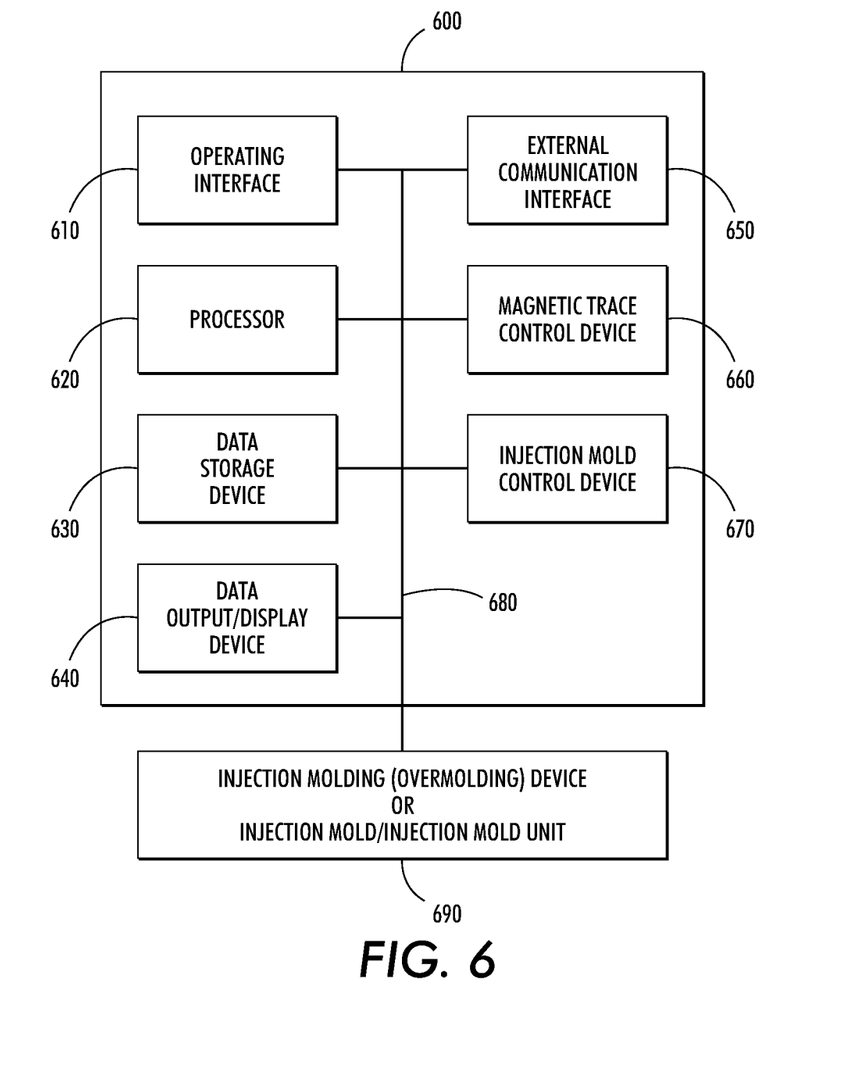
FIG. 6 illustrates a block diagram of an exemplary injection molding control device for effecting the injection molding processes in an injection molding device or in an injection mold/injection mold unit according to this disclosure.

FIG. 6 illustrates a block diagram of an exemplary injection molding control device 600 for effecting the injection molding processes in an injection molding device or in an injection mold/injection mold unit according to this disclosure.

The exemplary injection molding control device 600 may include an operating interface 610 by which a user may communicate with the exemplary injection molding control device 600. The operating interface 610 may be a locally accessible user interface associated with an injection molding (overmolding) device or injection mold/injection mold unit 690. The operating interface 610 may be configured as one or more conventional mechanisms common to control devices and/or computing devices that may permit a user to input information to the exemplary injection molding control device 600. The operating interface 610 may include, for example, a conventional keyboard, a touchscreen with "soft" buttons or with various components for use with a compatible stylus, a microphone by which a user may provide oral commands to the exemplary injection molding control device 600 to be "translated" by a voice recognition program, or other like device by which a user may communicate specific operating instructions to the exemplary injection molding control device 600. The operating interface 610 may also be a part of a function of a graphical user interface (GUI) mounted on, integral to, or associated with, the injection molding (overmolding) device or injection mold/injection mold unit 690 with which the exemplary injection molding control device 600 is associated.

The exemplary injection molding control device 600 may include one or more local processors 620 for individually operating the exemplary injection molding control device 600 and for carrying out operating functions of the injection molding (overmolding) device or injection mold/injection mold unit 690, including executing a thin wire securing scheme as a pre-processing step or an in-process step prior to executing an injection molding process in the injection molding (overmolding) device or injection mold/injection mold unit 690. Processor(s) 620 may include at least one conventional processor or microprocessor that interprets and executes instructions to direct specific functioning of the exemplary injection molding control device 600.

The exemplary injection molding control device 600 may include one or more data storage devices 630. Such data storage device(s) 630 may be used to store data or operating programs to be used by the exemplary injection molding control device 600, and specifically the processor(s) 620. Data storage device(s) 630 may be used to store information regarding individual magnetic trace patterns, or portions thereof, by which to direct placement of individual thin resistive wires on those magnetic trace patterns prior to executing the injection molding process. The data storage device(s) 630 may include a random access memory (RAM) or another type of dynamic storage device that is capable of storing updatable database information, and for separately storing instructions for execution of system operations by, for example, processor (s) 620. Data storage device(s) 630 may also include a read-only memory (ROM), which may include a conventional ROM device or another type of static storage device that stores static information and instructions for processor(s) 620. Further, the data storage device(s) 630 may be integral to the exemplary injection molding control device 600, or may be provided external to, and in wired or wireless communication with, the exemplary injection molding control device 600.

The exemplary injection molding control device 600 may include at least one data output/display device 640, which may be configured as one or more conventional mechanisms that output information to a user, including, but not limited to, a display screen on a GUI associated with the injection molding (overmolding) device or injection mold/injection mold unit 690 or on a separate computing device in wired or wireless communication with the injection molding (overmolding) device or injection mold/injection mold unit 690.

The exemplary injection molding control device 600 may include one or more separate external communication interfaces 650 by which the exemplary injection molding control device 600 may communicate with components external to the exemplary injection molding control device 600. At least one of the external communication interfaces 650 may be configured as an output port for connection to and/or communication with, for example, the injection molding (overmolding) device or injection mold/injection mold unit 690. Any suitable data connection in wired or wireless communication with an external data repository or external data storage device is contemplated to be encompassed by the depicted external communication interface 650.

The exemplary injection molding control device 600 may include a magnetic trace control device 660 as a part of a processor 620 coupled to, for example, one or more data storage devices 630, or as a separate stand-alone component module or circuit in the exemplary injection molding control device 600. The magnetic trace control device 660 may control at least the process of affixing thin resistive wire components to at least a portion of the magnetic trace pattern provided in at least one wall of an injection mold prior to injecting molten material into the mold to form an injection molded (overmolded) product with thin resistive wires embedded in the product. If the magnets, or magnetic elements, are electromagnets, or electromagnetic elements, the magnetic trace control device 660 may be used to control operation, such as ON and OFF operation, of the electromagnets, or electromagnetic elements, according to known methods.

The exemplary injection molding control device 600 may include an injection mold control device 670 as a part of a processor 620 coupled to, for example, one or more data storage devices 630, or as a separate stand-alone component module or circuit in the exemplary injection molding control device 600. The injection mold control device 670 may control the process elements associated with the injection molding process in the injection molding (overmolding) device or injection mold/injection mold unit 690, including controlling the injecting of the molten material into the mold to form an injection molded (overmolded) product with embedded thin resistive wires.

All of the various components of the exemplary injection molding control device 600, as depicted in FIG. 6, may be connected internally, and to one or more injection molding (overmolding) devices or injection molds/injection mold units 690 by one or more data/control busses 680. These data/control busses 680 may provide wired or wireless communication between the various components of the exemplary injection molding control device 600, whether all of those components are housed integrally in, or are otherwise external and connected to an injection molding (overmolding) device or injection mold/injection mold unit 690 with which the exemplary injection molding control device 600 may be associated.

It should be appreciated that, although depicted in FIG. 6 as an integral unit, the various disclosed elements of the exemplary injection molding control device 600 may be arranged in any combination of sub-systems as individual components or combinations of components, integral to a single unit, or external to, and in wired or wireless communication with the single unit of the exemplary injection molding control device 600. In other words, no specific configuration as an integral unit or as a support unit is to be implied by the depiction in FIG. 6. Further, although depicted as individual units for ease of understanding of the details provided in this disclosure regarding the exemplary injection molding control device

600, it should be understood that the described functions of any of the individually-depicted components may be undertaken, for example, by one or more processors 620 connected to, and in communication with, one or more data storage device(s) 630.

Those of skill in the art will recognize that references to one or more injection molding (overmolding) devices or injection molds/injection mold units 690 being controlled by the exemplary injection molding control device 600 described in detail above include implementations in which the exemplary injection molding control device 600 is associated with, and in control of: (1) one or more systems in which injection molding and/or overmolding processes are carried out; and/or (2) directly with one or more injection molds, or injection mold units. In this context, it is generally recognized that injection molds and injection mold units may be integral or separate components in injection molding and/or overmolding systems, devices or machines. The distinction is appropriate in the context that it is generally recognized, for example, that manufacturers of injection molds or injection mold units themselves, may be, and often are different from, and suppliers to, manufacturers of injection molding and/or overmolding systems, devices or machines that incorporate those injection molds or injection mold units.

Figure 7:
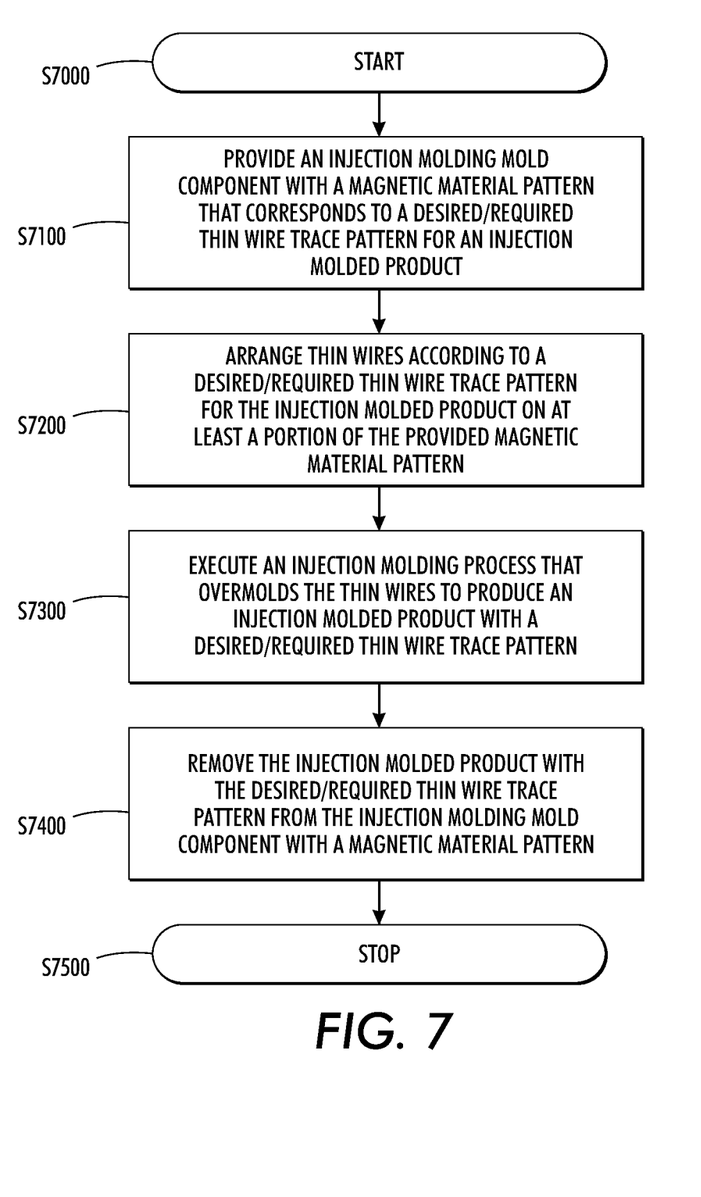
FIG. 7 illustrates a flowchart of an exemplary method for effecting the injection molding processes in an injection molding device according to this disclosure.

The disclosed embodiments may include a method for effecting an injection molding (overmolding) process in an injection molding device including magnetic holding elements for magnetically holding wires during the process. FIG. 7 illustrates a flowchart of an exemplary method according to this disclosure. As shown in FIG. 7, operation of the method commences at Step S7000 and proceeds to Step S7100.

In Step S7100, an injection molding mold component may be provided with a pattern of magnetic material or magnetic elements that may correspond to a desired and/or required thin wire trace pattern for an injection molded (overmolded) product. The magnetic material or magnetic elements may be in the form of individual magnets and/or a ferromagnetic material trace embedded in at least one wall of an injection molding mold outer wall or core. The magnetic material may be separately or additionally in the form of one or more controllable electromagnetic devices. Operation of the method proceeds to Step S7200.

In Step S7200, thin resistive wires may be arranged on all or some of the magnetic material elements in a pattern that may correspond to a desired and/or required pattern for an injection molded product formed in an injection molding device. The thin resistive wires may be pre-formed in the pattern, the pre-formed pattern being arranged on the magnetic material elements in the injection molding device. Operation of the method proceeds to Step S7300.

In Step S7300, once the thin resistive wires are secured to the magnetic trace elements in a manner that is designed to substantially immobilize those thin resistive wires, an injection molding process may be undertaken according to known methods to form an injection molding product in an injection molding mold, the injection molding product embedding the thin resistive wires in an overmolding process. Operation of the method proceeds to Step S7400.

In Step S7400, the injection molded product may be removed from the injection molding mold with the thin resistive wire elements securely embedded in the injection molded product according to a desired and/or required pattern for the thin resistive wires. Operation of the method proceeds to Step S7500, where operation of the method ceases.

As indicated above, the method may positively provide a level of repeatability in the thin resistive wire pattern formation and in configuration control with respect to the produced injection molded products with the embedded thin resistive wire patterns.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating and product processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in injection molding (overmolding) devices of many different configurations. Embodiments according to this disclosure may be practiced in product processing environments where tasks are performed by local and remote devices that may, for example, remotely direct injection molding operations in a particular injection molding (overmolding) devices. Remotely-located devices and components may be linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 7, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method for molding a product, comprising:
   magnetizing a portion of a molding mold, the magnetized portion of the molding mold having the shape of multiple wire-like lines;
   emplacing at least one wire on the magnetized portion of the molding mold such that the at least one wire has the same shape as the magnetized portion;
   controlling, with a processor, a flow of molding material into the molding mold to form an molded product that overmolds the at least one wire; and
   removing the molded product from the molding mold.

2. The method of claim 1, the magnetizing comprising embedding one or more magnetic elements in at least one of an outer wall, an inner core or an inert component of the molding mold, the magnetic elements having the shape of multiple wire-like lines.

3. The method of claim 2, the magnetizing further comprising embedding a magnetic trace in the at least one of the outer wall and the inner core component of the molding mold according to a predetermined pattern for wiring to be embedded in the molded product.

4. The method of claim 2, the one or more magnetic elements comprising a ferromagnetic material.

5. The method of claim 4, the ferromagnetic material having a Curie temperature higher than a highest temperature to which the molding mold may be elevated or exposed during a molding process.

6. The method of claim 4, the ferromagnetic material being Samarium Cobalt.

7. The method of claim 2, the one or more magnetic elements comprising one or more electromagnetic elements.

8. The method of claim 7, the one or more electromagnetic elements being individually controllable to form a predetermined magnetized pattern in the molding mold.

9. The method of claim 1, the molded product being a heatable solid ink melting component for use in an image forming device.

10. The method of claim 9, the emplacing the at least one wire comprising emplacing a pattern of resistive wires on the magnetized portion of the injection molding mold according to a predetermined pattern, the pattern of resistive wires being overmolded with the molding material.

11. The method of claim 1, the emplacing the at least one wire comprising executing an automated process for positioning a predetermined wire pattern on the magnetized portion of the molding mold.

12. The method of claim 11, the automated process comprising directing movements of an automated device for positioning the predetermined wire pattern on the magnetized portion of the molding mold.

13. The method of claim 1, the molding mold being an injection molding mold and the molding material being an injection molding material for producing injection molded product in an injection molding process.

14. An injection molding process control device, comprising:
   a storage device for storing at least one predetermined pattern for emplacing at least one wire on a magnetized portion of a molding mold, the magnetized portion of the molding mold having the shape of multiple wire-like lines; and
   a mold control device that controls (1) the emplacing of the at least one wire on the magnetized portion of the molding mold by referencing the stored at least one predetermined pattern such that the at least one wire has the same shape as the magnetized portion, and (2) a flowing of a molding material into the molding mold to form a molded product that overmolds the at least one wire in a product molding process.

15. The device of claim 14, the magnetized portion comprising at least one of magnetic elements and magnetic traces embedded in at least one of an outer wall or an inner core component of the molding mold, the magnetic elements or magnetic traces having the shape of multiple wire-like lines.

16. The device of claim 15, the at least one of the magnetic elements and magnetic traces comprising a ferromagnetic material having a Curie temperature higher than a highest temperature to which the molding mold may be elevated or exposed during the product molding process.

17. The device of claim 14, the magnetized portion comprising one or more electromagnetic elements, the one or more electromagnetic elements being individually controllable to form the at least one stored predetermined pattern, the device further comprising a magnet control device that energizes the one or more electromagnetic elements according to the at least one stored predetermined pattern securing the at least one wire in the product molding process.

18. The device of claim 14, wherein the mold control device controls the flowing to form a heatable solid ink melting component for use in an image forming device.

19. The device of claim 18, the mold control device controlling the emplacing a pattern of resistive wires on the magnetized portion of the molding mold according to the stored predetermined pattern, the pattern of resistive wires being overmolded with the molding material.

20. The device of claim 19, the mold control device controlling an automated process for emplacing the pattern of resistive wires by directing movements of an automated device for positioning the stored predetermined wire pattern on the magnetized portion of the molding mold.

21. The device of claim 14, the mold control device controlling injection of an injection molding material into an injection molding mold to form an injection molded product that overmolds the at least one wire in an injection molding process.

22. A non-transitory computer-readable medium storing instructions which, when executed by a processor, cause the processor to execute the steps of a method for controlling a molding process, the method comprising:
   magnetizing a portion of a molding mold, the magnetized portion of the molding mold having the shape of multiple wire-like lines;

emplacing at least one wire on the magnetized portion of the molding mold such that the at least one wire has the same shape as the magnetized portion;

flowing a molding material into the molding mold to form a molded product that overmolds the at least one wire; and removing the molded product from the molding mold, the magnetizing comprising at least one of embedding one or more magnetic elements and a magnetic trace in at least one of an outer wall and an inner core component of the molding mold according to a predetermined pattern for wiring to be embedded in the molded product.

* * * * *